June 28, 1966     E. LORETAN     3,258,047

SAFETY DEVICE FOR SCREW ASSEMBLING

Filed April 28, 1964

INVENTOR.
EDOUARD LORETAN
BY
*Kenwood Ross*
ATTORNEY 3,258,047
SAFETY DEVICE FOR SCREW ASSEMBLING
Edouard Loretan, Le Sentier, Switzerland, assignor to
 Parechoc S.A., Le Sentier, Switzerland, a firm of
 Switzerland
Filed Apr. 28, 1964, Ser. No. 363,257
Claims priority, application Switzerland, May 4, 1963,
5,647/63
2 Claims. (Cl. 151—35)

The present invention is directed to a locking device which is characterised by the fact that it comprises two resilient washers applied one against the other, each being provided with lugs bent out of the general plane of the washer, the lugs of one of the washers passing in the apertures provided by the lugs of the other washer and protruding slightly out of the outer face of said other washer, wherefor when the assembly is tightened, the extremities of the lugs of each washer come respectively into contact with one of the two elements being assembled, the two washers constituting, by their thickness, a rigid abutment preventing the squashing of the lugs.

The drawings show, by way of example, one embodiment of the invention.

Figure 1:
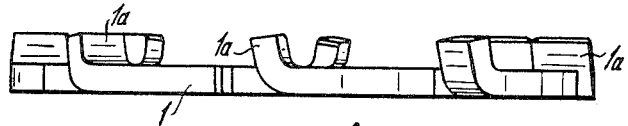
FIG. 1 is an elevational view of a washer constituting one of the two elements of the safety device.
Figure 2:
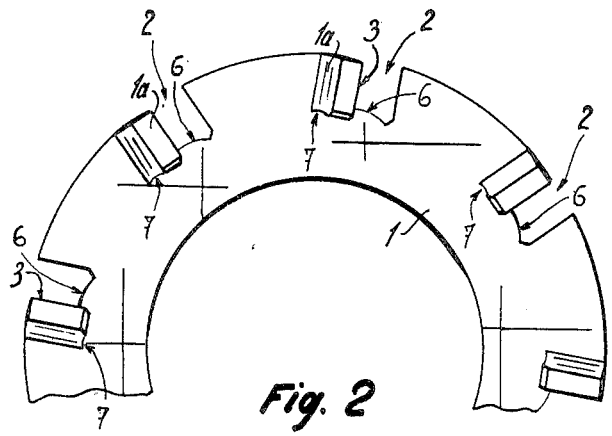
FIG. 2 is a plan view of a part of this washer.
Figure 3:
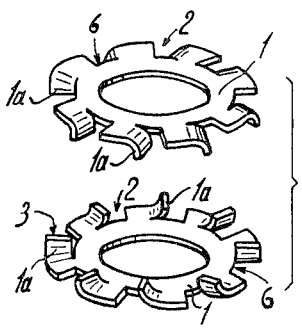
FIG. 3 is a perspective view of two washers constituting the safety device, these washers being represented in a position separated one from the other.

FIGS. 1 and 2 illustrate a washer 1 provided with lugs 1a cut out from and bent out of the general plane of the washer. The cutting of these lugs provides apertures 2 having the shape of inwardly extending notches opening on the periphery of the washer. The edge 3 of the free extremity of each lugs 1a extends approximately radially with respect to the washer 1.

The safety device comprises two washers 1 applied one against the other in such a way that the lugs 1a of each pass through the apertures 2 of the other washer. The length of the lugs 1a is such that, once the two washers are disposed one against the other, the lugs of one of them protrude slightly outwardly of the plane of the outer face of the other washer. Moreover, the width of the notches 2 is only slightly greater than the thickness of the lugs 1a so that the interengagement of the lugs in the notches of the two washers prevents same from rotating relatively to each other any appreciable amount.

Figure 4:
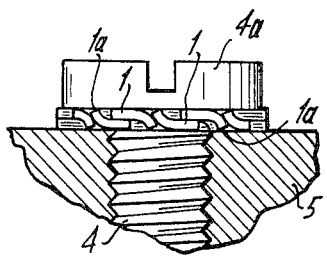
FIG. 4 is a sectional view of a screw assembling provided with the safety device according to the invention.

When the safety device is mounted on the rod of a screw, such as the screw 4 of FIG. 4, the free extremities of the lugs 1a come into contact with the elements of the assembly. Thus, in the example represented in FIG. 4, the extremities of the lugs of one of the washers 1 are in contact with the head 4a of the screw 4 while the extremities of the lugs of the second washer are in contact with the tapped element, designated by 5, in which is screwed the screw 4. The two washers constitute, by their thickness, a rigid abutment permitting the screw 4 to be locked without squashing the lugs. In case the screw 4 tends to be unscrewed, the lugs 1a take a firm stand, respectively on the element 5 and on the head 4a, and prevent any untightening of the assembly.

It is to be noted that the bottom of the notches, designated by 6, is constituted by a convex surface, so that the internal radial face of the lugs, designated by 7, is concave. This allows the result that the lugs of one washer clasp on the other washer so as to prevent the two washers from being separated one from the other.

What I claim is:

1. A locking device for a threaded fastener used in assembling a pair of elements relative to each other, comprising, an interlocking pair of oppositely-disposed and identical upper and lower resilient disc-like washers, each said washer including an annular body having a front face and a rear face and a series of radially-extending notches equispaced along and extending inwardly of its outer periphery and a series of equispaced circumferentially-arranged curved lugs along corresponding radial margins of each of the notches and projecting outwardly from the plane of the front face, each lug having an outer free extremity extending radially with respect to its said washer, the lugs of said upper washer being interdigitably received in the notches of said lower washer and having free ends extending beyond the plane of the rear face of said lower washer and the lugs of said lower washer being interdigitably received in the notches of said upper washer and having free ends extending beyond the plane of the rear face of said upper washer, the lugs of said upper and lower washers having buttressing contact with the respective adjacent one of the elements being assembled as the front faces of said washers are brought into confronting positions as to each other in interlocked operative relationship with the rear faces of adjacent pairs of lugs having an increasing bearing relationship as to each other under flexure of the lugs upon the application of pressure to the locking device.

2. In a locking device according to claim 1 wherein the width of said notches is only slightly greater than the thickness of said lugs whereby the washers are prevented from rotating one with respect to the other.

References Cited by the Examiner
UNITED STATES PATENTS
2,041,568  5/1936  Olson _____ 151—35
2,124,249  7/1938  Guiducci _____ 151—35

FOREIGN PATENTS
661,412  6/1938  Germany.
82,526  6/1933  Sweden.

EDWARD C. ALLEN, Primary Examiner.